(12) United States Patent
Haley (10) Patent No.: US 8,104,787 B2
(45) Date of Patent: Jan. 31, 2012

(54) MATERIAL HANDLING CART

(76) Inventor: Chris Lyman Haley, Aumsville, OR (US)

( * ) Notice: Subject to any disclaimer, the term of this patent is extended or adjusted under 35 U.S.C. 154(b) by 158 days.

(21) Appl. No.: 12/583,201

(22) Filed: Aug. 17, 2009

(65) Prior Publication Data

US 2010/0059952 A1 Mar. 11, 2010

Related U.S. Application Data

(60) Provisional application No. 61/191,552, filed on Sep. 11, 2008.

(51) Int. Cl.
*B62B 3/02* (2006.01)
*B62B 3/04* (2006.01)
*B62B 1/26* (2006.01)
*A47F 5/12* (2006.01)

(52) U.S. Cl. .............. 280/639; 280/47.18; 280/47.19; 280/47.41; 280/79.7; 248/139; 248/371; 108/7; 108/115

(58) Field of Classification Search .............. 280/30, 280/35, 639, 651, 47.17, 47.18, 47.19, 47.34, 280/47.35, 47.41, 79.11, 79.3, 79.7; 211/13.1; 248/139, 371, 393; 108/6, 7, 9, 10, 115
See application file for complete search history.

(56) References Cited

U.S. PATENT DOCUMENTS

| | | | | |
|---|---|---|---|---|
| 3,698,577 A * | 10/1972 | Dean | .............................. | 414/343 |
| 5,862,761 A * | 1/1999 | Moore | ............................ | 108/92 |
| 7,044,496 B2 * | 5/2006 | Holmes | ......................... | 280/639 |
| 7,278,646 B2 * | 10/2007 | Chuang | ........................ | 280/47.34 |
| 7,341,006 B2 * | 3/2008 | Hernandez | ..................... | 108/115 |
| 2002/0125662 A1 * | 9/2002 | Magness | ......................... | 280/30 |
| 2003/0001348 A1 * | 1/2003 | Weida | ......................... | 280/47.19 |
| 2003/0127834 A1 * | 7/2003 | Click | ............................ | 280/651 |
| 2005/0040618 A1 * | 2/2005 | Beatty | .......................... | 280/79.3 |
| 2008/0067786 A1 * | 3/2008 | Liu et al. | ........................ | 280/639 |

* cited by examiner

*Primary Examiner* — John R Olszewski

(57) ABSTRACT

A material handling cart to assist one person in handling large sheets of material such as sheets of plywood and easily transport said sheets to a machine for machining or other operations. With the tilting table feature in the vertical position it will easily transport a large sheet of material through a walk-through door 32 inches or wider. Arriving at said machine or workbench, two of the four casters can be locked, the table tilted flat and said material can be slid off the cart into the machine or onto the bench. It was designed for the home workshop or small cabinet shop, but obviously would work well in many other applications. It is also convenient for unloading materials from a pickup truck and transporting to a storage rack or other storage units.

1 Claim, 11 Drawing Sheets

LEFT END VIEW

THE TWO MAJOR COMPONENTS

FIG. 1

FIG. 2 – FRONT VIEW

FIG. 3 – LEFT END VIEW

FIG. 4 – TOP VIEW

FIG. 5 - THE TWO MAJOR COMPONENTS

FIG. 6 – BASE UNIT

FIG. 7 – RECEIVER UNIT

FIG. 8 - CROSS SECTION HEIGHT ADJUSTMENT ASSEMBLY

FIG. 9 – PIVOT SLEEVES AND COLLARS

FIG.10 – MATERIAL CLAMP ASSEMBLY

FIG. 11 – TILT CONTROL ASSEMBLY

MATERIAL HANDLING CART

I claim provisional application 61/191,552 that was recorded on Sep. 11, 2008 as a part of this application.

The Sheet Material Handling Cart hereafter referred to as the "cart", FIGS. 1 through 11 is made up of (2) assemblies, 1) The Base Unit (lower unit), and;
2) The Receiver Unit (upper unit), see FIGS. 1 through 4.

The base unit provides the cart mobility and support for the receiver unit. The Receiver Unit provides for the loading, unloading and rotating of sheet material. The receiver unit attaches to the base unit via a post that slides over and encases a post of the base unit (see FIG. 5) and is height adjustable due to the compression/friction lock mechanism.

Figure 6:
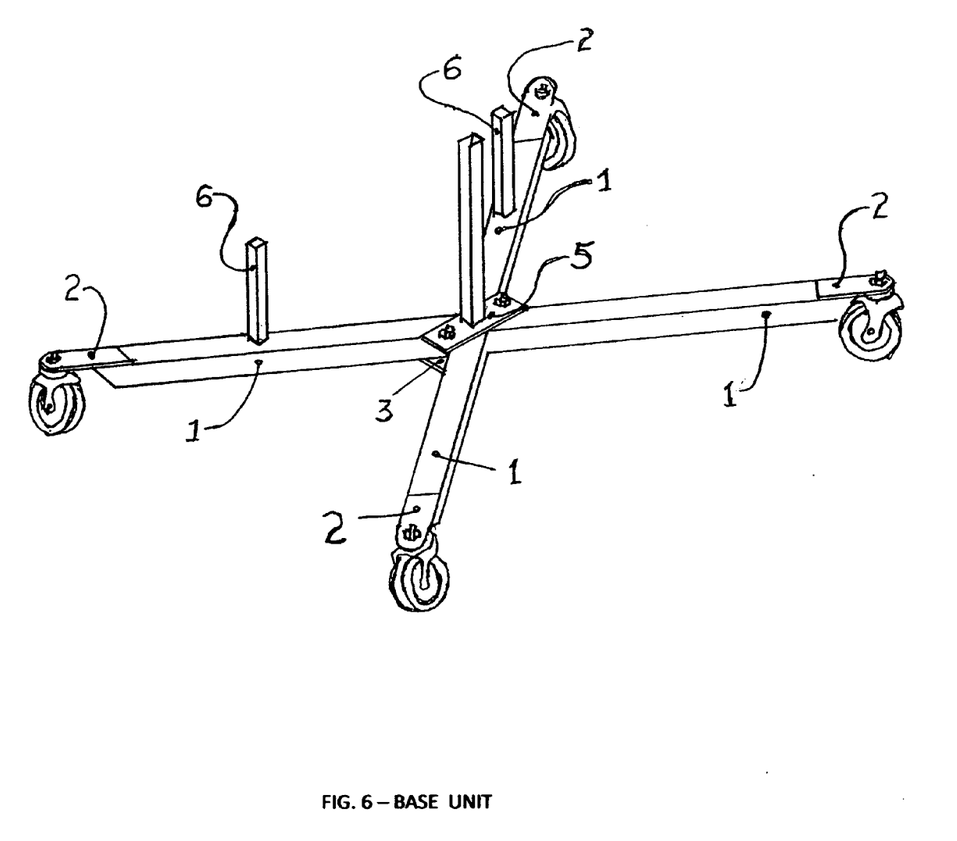
FIG. 6 shows the base unit with the numbers to identify the various parts referred to in the detailed description

1. Base Unit (FIG. 6)

The Base Unit consists of two (2) components; the Leg assembly, and; the Post.

A) The Leg Assembly.

There are four (4) square tubing metal Legs #1, attached together in the shape of an X which lies horizontally. There are four (4) caster wheel attachment plates #2, one (1) attached to the top side and at the end of each leg. There are four (4) caster wheels. One (1) caster wheel attached to each of said plates. The two (2) front caster wheels have locking mechanisms so the cart can be made immobile when desired. Attachment plate #3 is rectangular in shape, with two (2) holes. Said plate is attached to the underside, and in the center of the X leg assembly. The common centerline of the two (2) holes in said plate is the centerline/longitudinal axis of the cart as viewed from the top. Said two (2) holes provide for the attachment of Post #4 via base plate #5. There are two (2) Table stops #6, attached to the top of the rear legs. Said stops are square metal tubing and provide table support while the table is in the upright position.

B) The Post

Post #4 is a square tubing metal post. A slot in the right face of said post runs vertically from the top of the post downward approximately ⅓ the height of the post. Said slot is for the height adjustment mechanism. Attached to the bottom end, and perpendicular to post #4, is base plate #5. Said base plate sits on top of, and in the center of, the X leg assembly. Said base plate is rectangular in shape with two (2) holes that align with the holes in attachment plate #3. Threaded machine bolts are placed upward through the holes in attachment plate #3, and base plate #5. Said bolts are secured with Threaded nuts attaching Post #4, to the Leg assembly.

Figure 7:
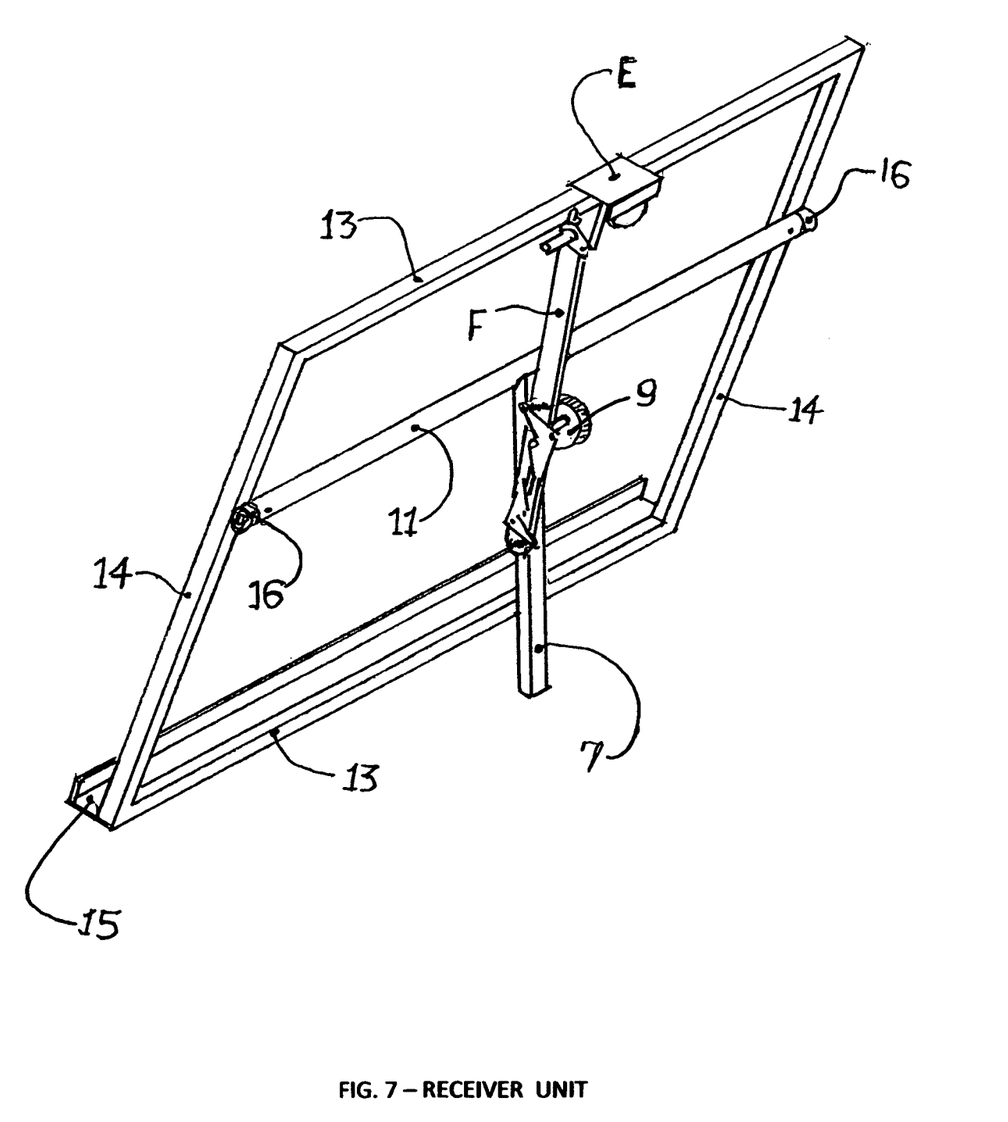
FIG. 7 shows the receiver unit with the numbers to identify the various parts referred to the detailed description
Figure 8:
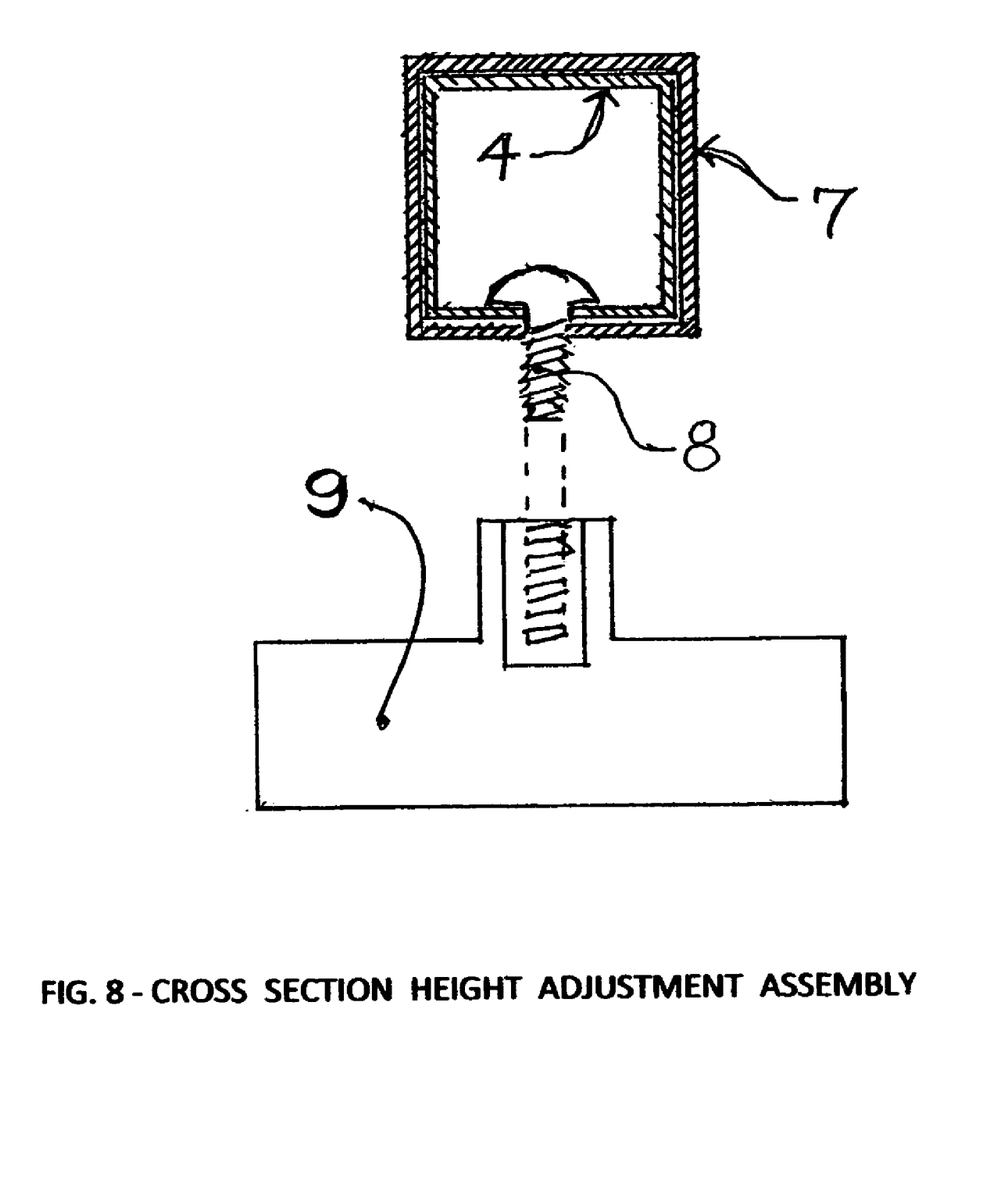
FIG. 8 shows the cross section of the height adjustment assembly with various parts numbered

2. Receiver Unit (FIG. 7)

The Receiver Unit consists of four (4) sub-assemblies; C) the T-post assembly, D) the table assembly, E) the Material Clamp, and F) the tilt control assembly.

All four (4) sub-assemblies are connected in the following way; the T-post assembly attaches to the table assembly via pivot collars, the material clamp attaches to the table via a compression, and the tilt control assembly attaches to the Table and T-post assemblies via threaded machine bolts and nuts.

Figure 5:
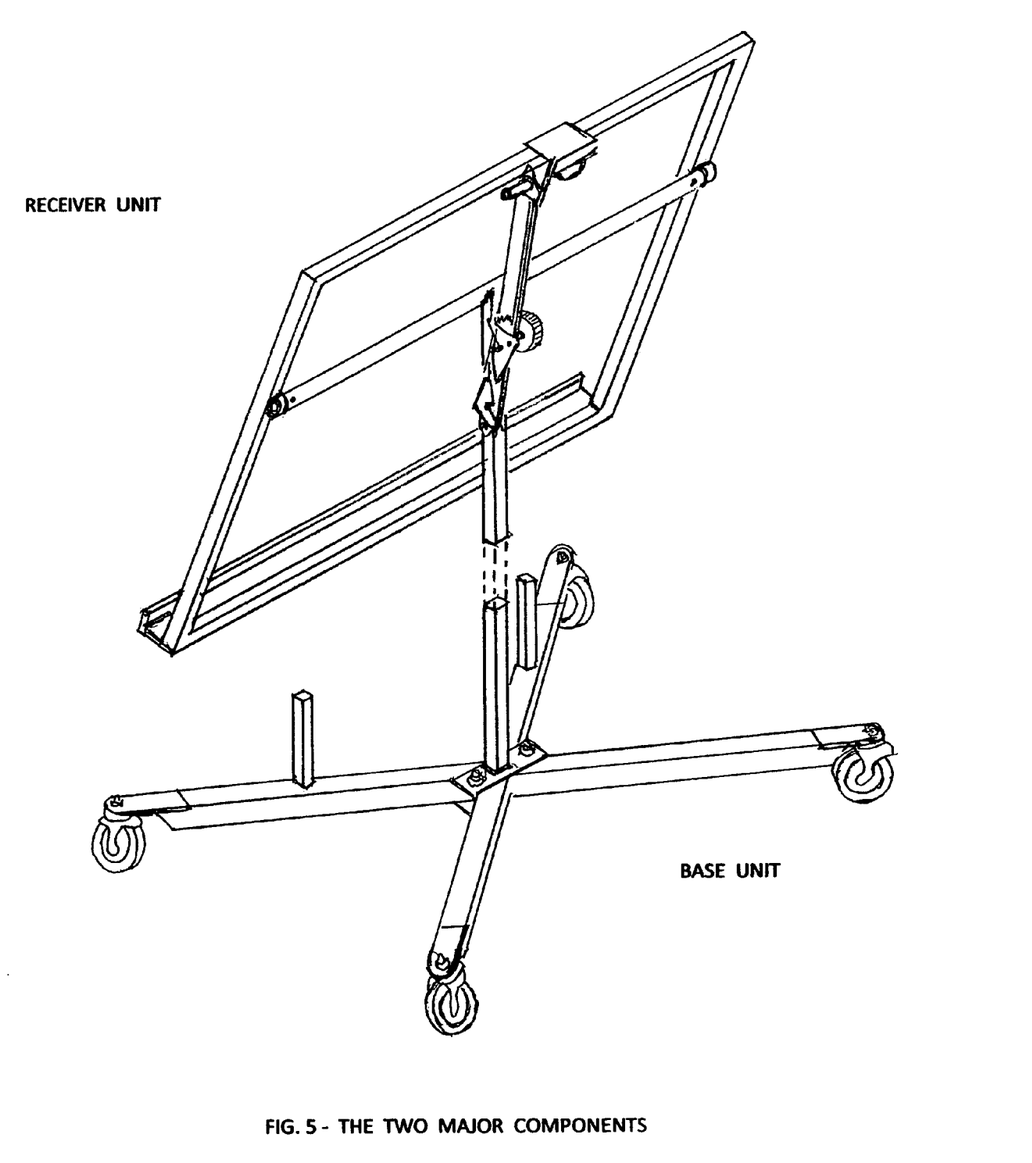
FIG. 5 shows how the receiver unit and the base unit fit together
Figure 9:
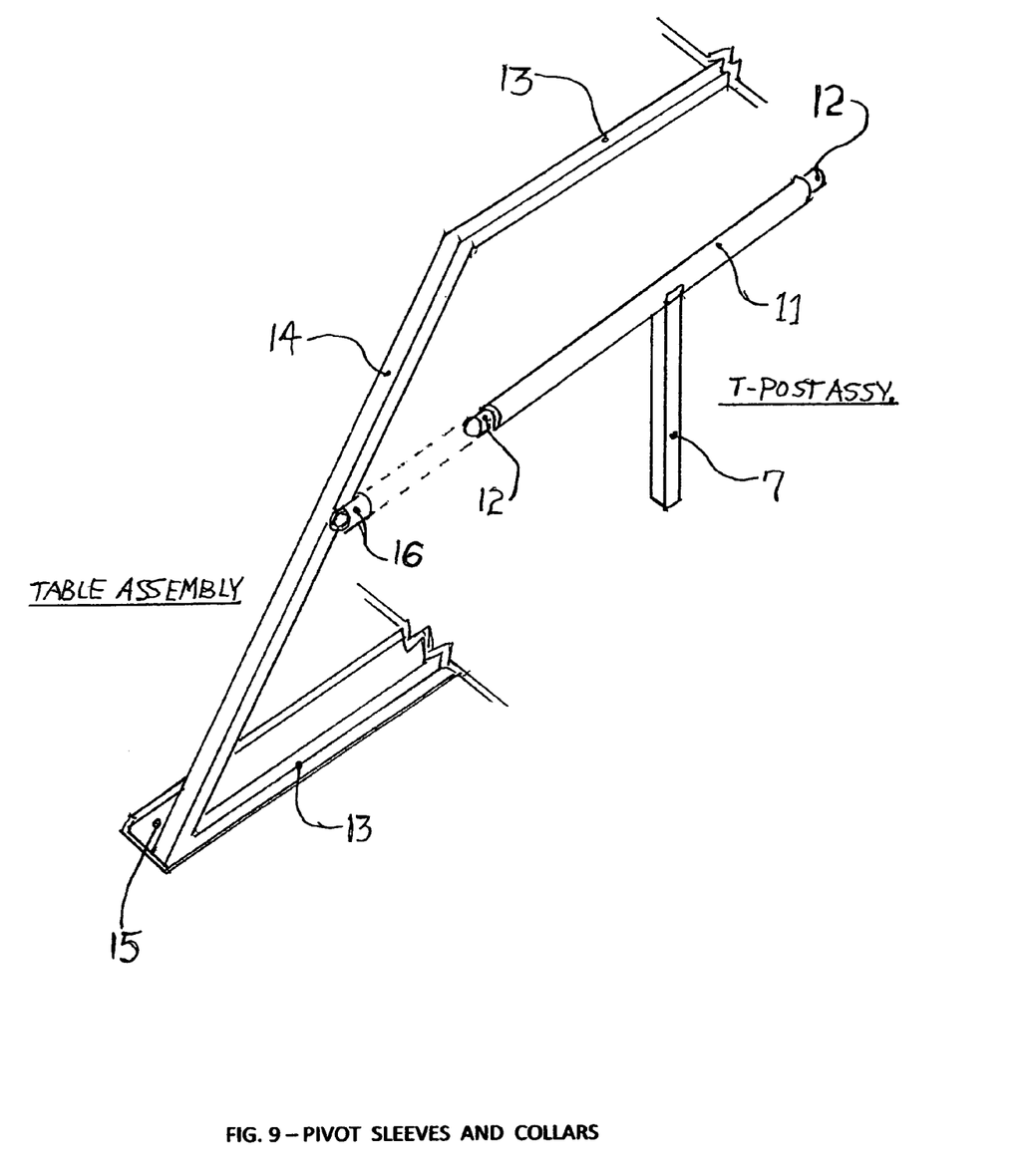
FIG. 9 is a breakdown of the pivot sleeves and collars that allow the table assembly to pivot from near vertical to the flat position with various parts numbered

C) The T-Post (FIGS. 9 & 5)

Post #7 is a square tubing metal post that slides over and encases post, #4 of the base unit. On the right face of Post #7, near the top, is a hole that coincides with the slot of post #4. Said slot and hole are for the Height Adjustment Mechanism (see FIG. 8). Carriage bolt #8 is inserted into the slot of post #4 with the head of said bolt on the inside of post #4. The square portion of said carriage bolt head, rides in said slot. The threaded part of carriage bolt #8 extends outside post #4, through the hole of Post #7 and protrudes out far enough to receive Knob #9. Said knob has a female threaded insert in the handle that threads onto said carriage bolt. Rotating knob #9 clockwise tightens said knob towards the head of said carriage bolt drawing post, #7, tight to post, #4. This clamps said posts together via compression and friction and locks the height of the receiver unit. Turning knob #9 counterclockwise removes the compression and allows the receiver unit to slide up or down. Tilt Control attachment nut #10, is attached to the left outside face of post #7, near midpoint height of said post. The center axis of the threaded hole of said nut is perpendicular to the left face of said post. Table Support tube #11 is a metal tube attached to the top of post #7 and runs horizontally the length of the cart. Said support tube is aligned with the centerline/longitudinal axis of the cart as viewed from the top. Support tube #11 is perpendicular to post #7. Support Tube #11 has two (2) Pivot Sleeves #12, one (1) inserted and attached inside each end of said Support Tube (see FIG. 9). Pivot sleeves #12 protrude beyond the ends of support tube #11 to provide for the attachment of pivot collars #16.

D) The Table

The table is a frame that is rectangular in shape and made of square metal tubing. It is the same length as the bate unit and is slightly wider than said table's length. Front and rear tubes #13, are attached to end tubes #14 at the corners. Attached to the top of said rear tube #13, is metal angle #15. With the table in the flat position and viewed from the end of said table, the top flange of the angle is turned in toward the table, creating the Material Support Channel. Front tube #13, and end tubes #14, have hi-density nylon tape attached to the top surface of said tubes to create a slippery surface that allows for easy feeding of sheet material on to, and off of, the cart. Said table has two (2) Pivot Collars #16 (see FIGS. 7 & 9). Said pivot collars are attached to the underside of end tubes #13 at approximately the one third (⅓) point back from the front end of said tubes. The center axis of said pivot collars, are parallel with the longitudinal axis of the cart. Said Pivot Collars slide over and encase pivot sleeves #12 located at the ends of Support Tube #11 and attaches said table to support tube #11. Said attachment allows said table to rotate about the longitudinal axis of the cart. Tilt Control attachment plate #17 provides for the attachment of the tilt control assembly, to said table. Plate #17 is attached to the bottom side of front tube #13. The location of Plate #17 on front tube #13 is such that it aligns the left face of said plate with the left face of the Tilt Control attachment nut #10.

There are three (3) holes in front tube #13 for the Material Clamp. One (1) hole on each the front and rear face and one (1) hole on the bottom face of said tube. The center axis of the holes on the front and rear face are aligned with each other and are perpendicular to the front face of said tube. Said two (2) holes are centered from top to bottom of tube #13, and offset slightly to the right along the length of said tube. These holes receive clamp rod #19. The third hole on the bottom face of tube #13 is centered from front to back and the center axis of the hole is perpendicular to, and aligns with the center axis of the other said two (2) holes. The threaded hole of nut #18 is aligned with the bottom hole and attached to the bottom face of front tube #13. Nut #18, receives clamp tightening knob #21.

Figure 10:
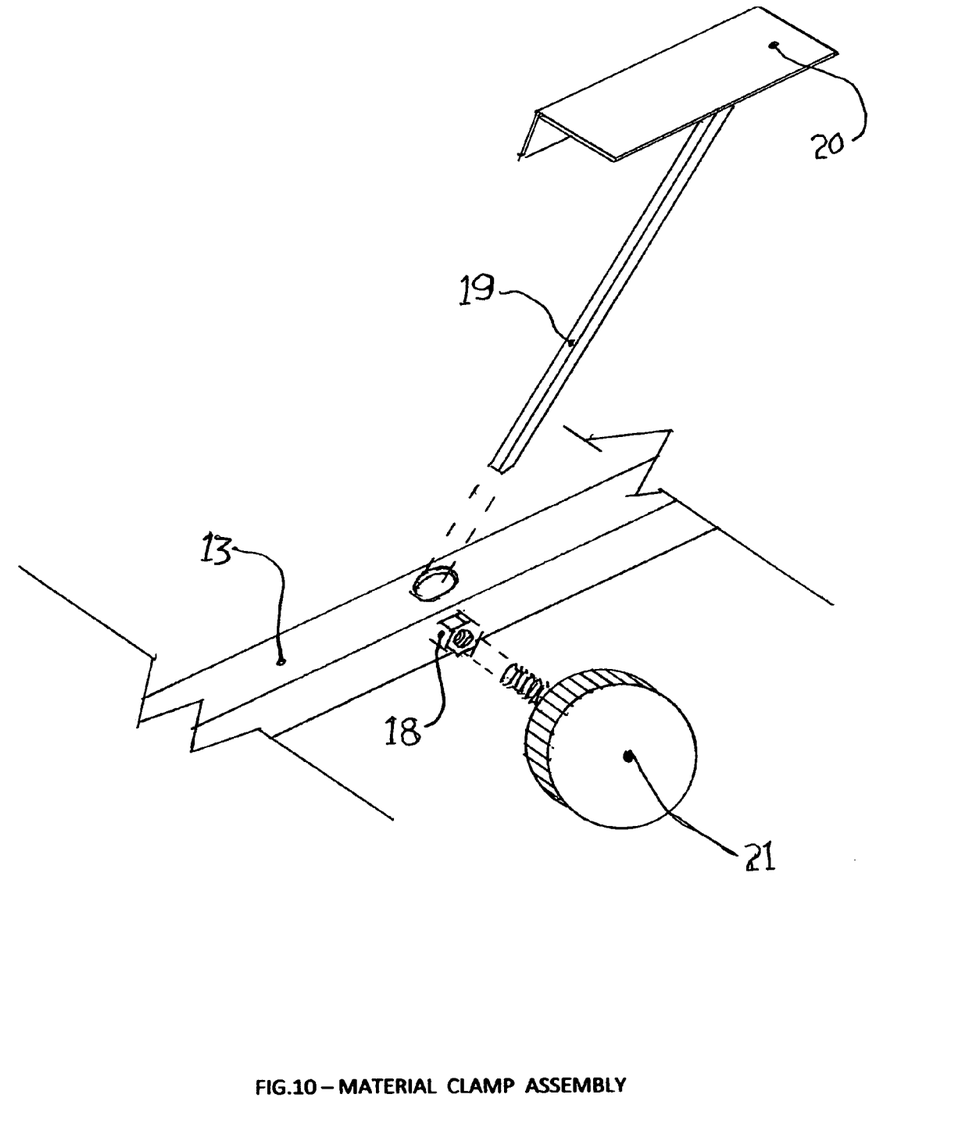
FIG. 10 is a breakdown of the material clamp assembly with the various parts numbered

E) The Material Clamp (FIGS. 7 & 10)

The material clamp consists of clamp rod #19, and clamp jaw #20 (see FIG. 10). Clamp rod #19 is a solid metal square rod and clamp jaw #20 is an A-symmetrical metal angle. Clamp rod #19 is attached perpendicular to the wide face of clamp jaw #20. The end of said clamp rod is centered lengthwise on Clamp jaw #20, flush with the edge opposite the narrow flange, and the narrow flange of said clamp jaw is turned toward clamp rod #19. This creates a J shaped clamp. Clamp rod #19 is inserted through the front and rear holes respectively of front tube #13. Said clamp is free to rotate and slide in said holes as long as Clamp Tightening Knob #21 is loose. Said knob has a threaded stud that threads into nut #18 on the bottom face of front tube #13. Rotating the knob clockwise tightens the threaded stud of said knob against the side of clamp rod #19 which prevents the Material Clamp from moving.

When the material clamp is stowed; said clamp is pushed all the way in towards the table, the jaw fading away from the top of the table, and knob #21 is tight.

When the material clamp is used; with the table in its upright position the material support channel is down near the bottom of the cart and the clamp is up at the top of the cart. Sheet material is placed on edge, in the material support channel and leaned against the table. The clamp is then loosened, extended upward, and the jaw rotated towards the top of the table. This allows the jaw to hook over the sheet material. The jaw is then slid down firmly against the sheet material and the knob is tightened. This clamps the material between the jaw and the material support channel, securely attaching it to the cart. This allows the operator to move the cart or rotate the sheet material without fear that the material will separate from the cart.

Figure 3:
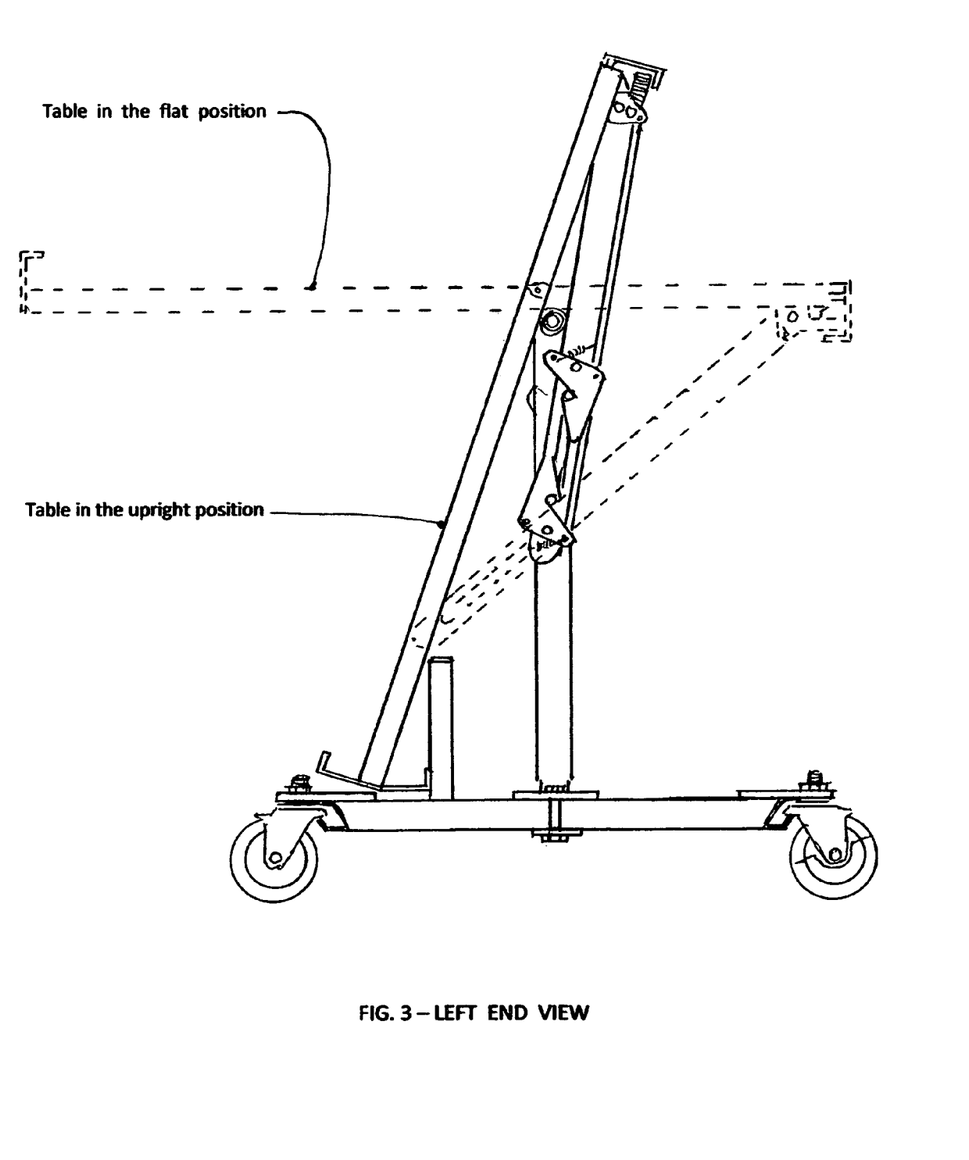
FIG. 3 is the left end view
Figure 4:
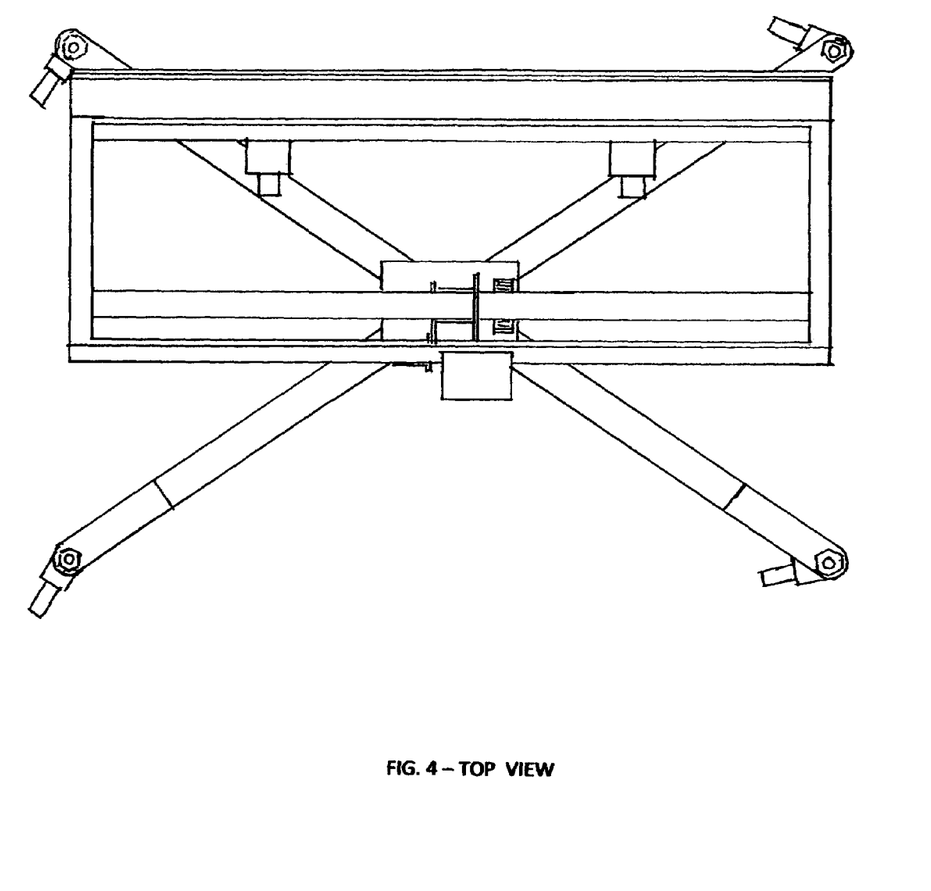
FIG. 4 is the top view
Figure 11:
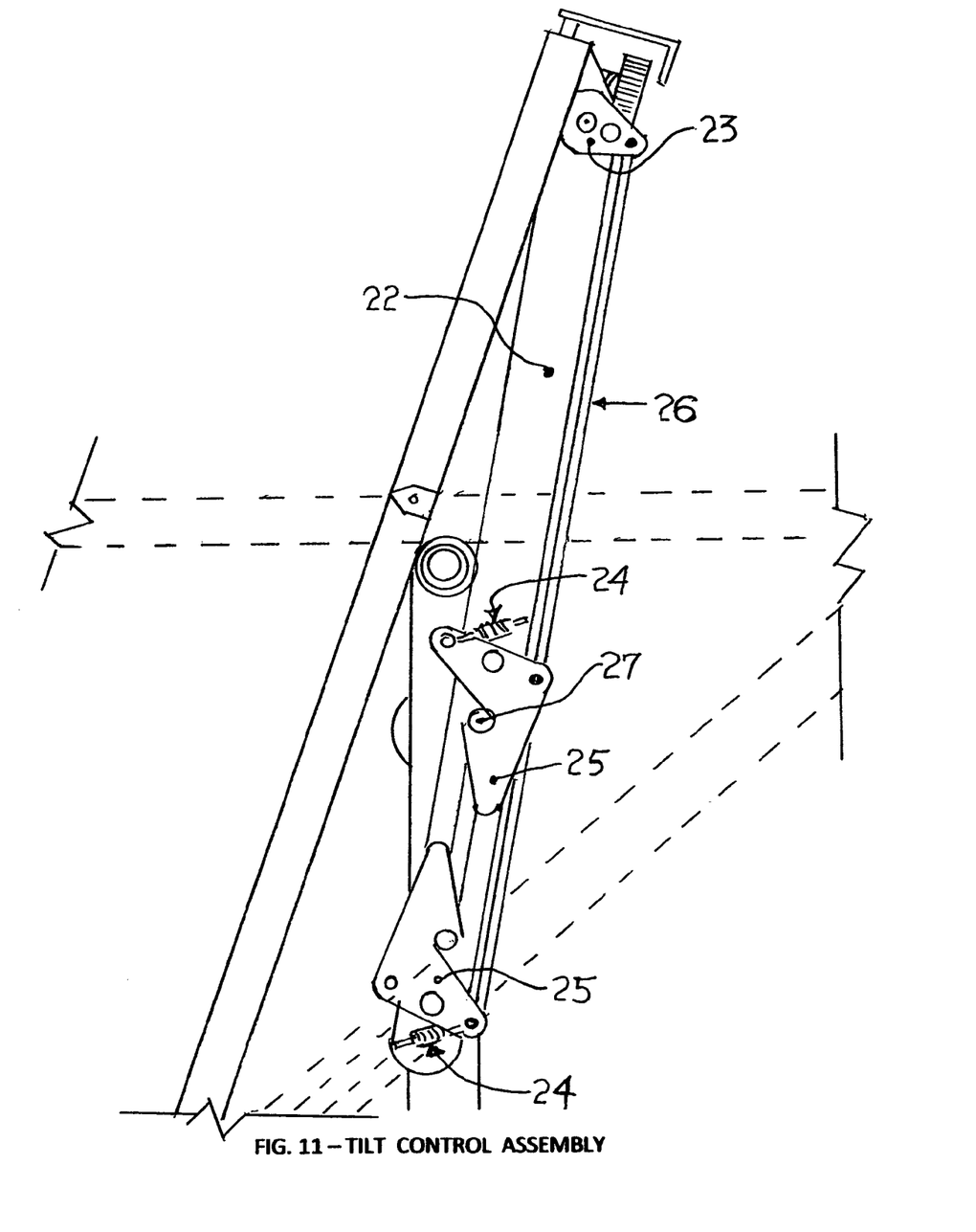
FIG. 11 is a breakdown of the tilt control assembly with the various parts numbered

F) The Tilt Control Assembly (FIGS. 3 & 11)

Tilt control assembly automatically locks the table in either the flat or the upright position (refer to FIGS. 7 & 11). Tilt Control Assembly components are; the arm #22, the handle #23, two (2) springs #24, two (2) latches #25, an actuating wire #26, and one (1) round head cap screw #27. Arm #22 is a metal strap, round in shape at both ends. One end of arm #22 attaches to the left side of tilt control attachment plate #17 via a machine bolt and threaded nut. This attaches arm #22 to the table. The other end of said arm has a slot that is approximately one third ⅓ the length of the arm. The width of said slot is the diameter of the threaded portion of cap screw #27. The threaded portion of cap screw #27 goes through said slot and tightens to tilt control attachment nut #10 on Post #7. Because the diameter of the head of cap screw #27 is larger than the width of the slot it allows the arm to slide the length of said slot and not disconnect from Post #7. This attaches arm #22 to Post #7. Latches #25 mount on the left side of arm #22 one (1) near each end of said slot via a machine bolt and threaded nut. Latches #25 are preloaded in the dosed or locked position by springs #24. In the locked position the jaw of one of said latches wrap partway around the head of cap screw #27 and will not allow arm #22 to slide. As the arm slides latches #25 have tapered tips that extend over each end of said slot that allow the head of cap screw #27 to move said latches to the side until it locks. Latches #25 are connected to each other and handle #23 by actuating wire #26. Handle #23 is attached to the left face of arm #22 using the same machine bolt and threaded nut that attaches said arm to the table. Handle #23 is a round solid metal rod attached perpendicular to a flat metal plate. Said plate has two (2) holes. The top hole is for attachment of said handle to arm #22. The bottom hole is for attachment of actuating wire #26. When handle #23 is pulled outward away from the table, the handle rotates about its attachment bolt axis. This rotation pulls actuating wire #27 and opens, or unlocks latches #25. This allows arm #22 to slide the length of the slot until the head of cap screw #27 locks in the jaw of the other latch #25, which places the table in the new position.

Figure 1:
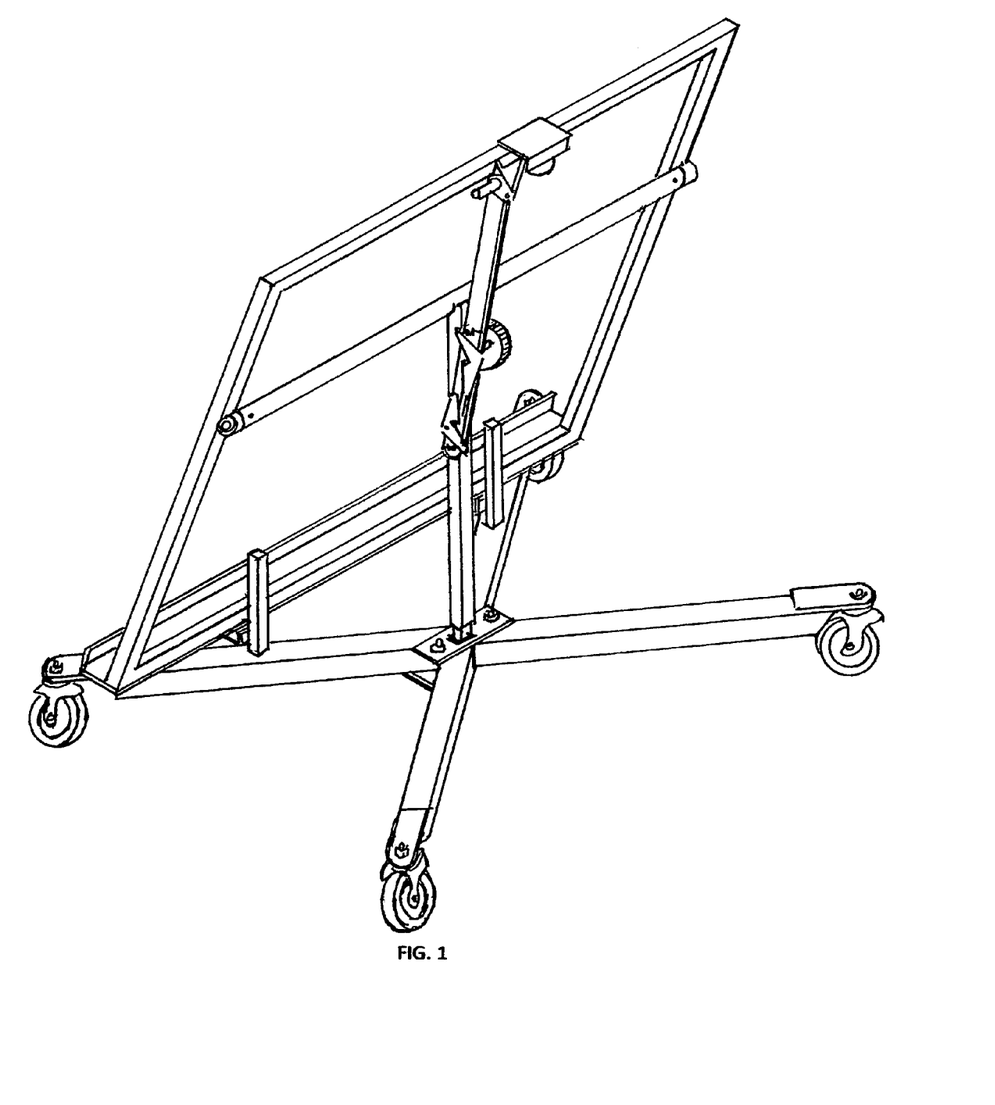
FIG. 1 is a three dimensional view of the sheet material handler
Figure 2:
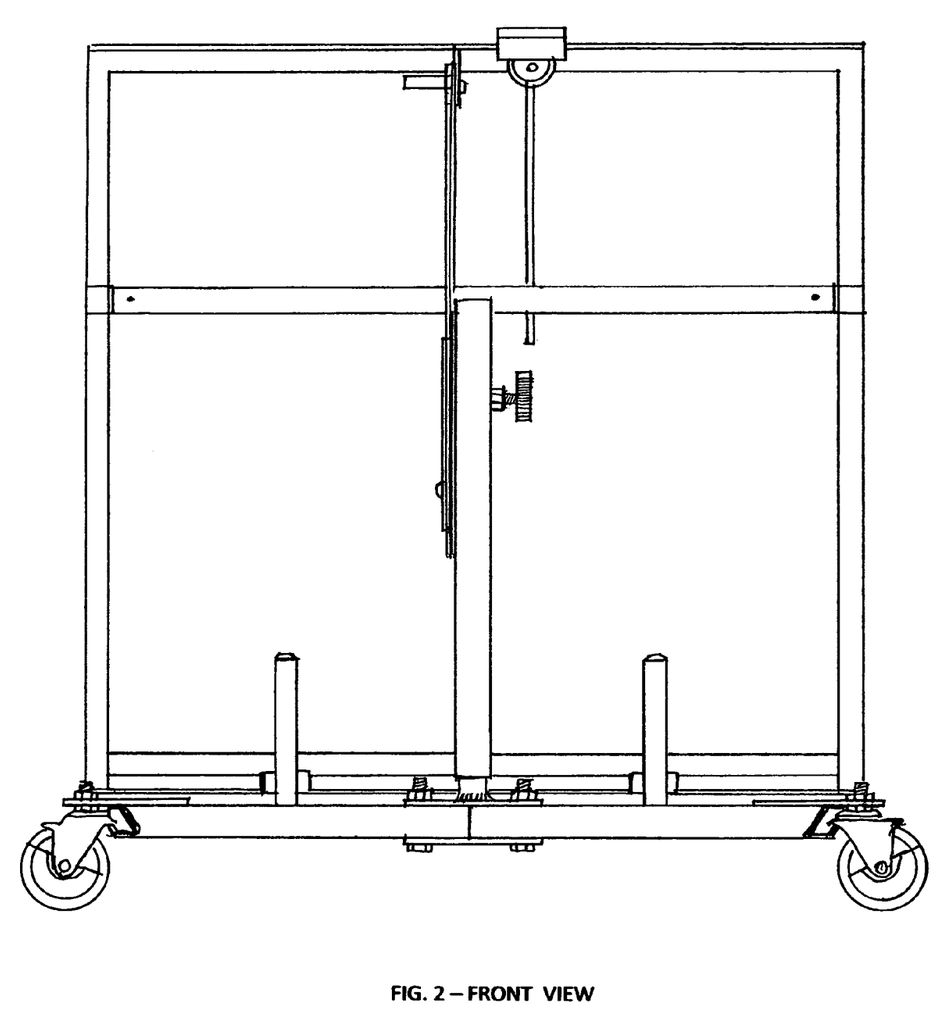
FIG. 2 is the front view

DEFINITIONS front—side of the cart and its components as viewed in FIG. 1.
back—side of the cart and its components opposite the front of the cart.
right end/right side—right end or side of the cart and its components as viewed from the front.
Left end/left side—left end or side of the cart and it's components as viewed from the front.
top—top of the cart and it's components as viewed in FIG. 3.
cart length—distance from the left end of the cart to the right end of the cart.
cart width—distance from the front of the cart to the back of the cart.
centerline/longitudinal axis of the cart—as viewed from the top, is the line/plane/axis that runs the length of the cart and divides the x frame/base unit and the T-Post assembly into two (2) equal parts. The Sheet Material Handler is a mobile cart used to handle sheet material. However, the size of the cart and it's components will vary depending on the type of material to be handled, e.g.; glass, sheet metal, wallboard, etc.

BRIEF SUMMARY OF THE INVENTION

The cart is a mobile sheet material handling cart that allows one individual to move sheet material e.g.: plywood, glass, wallboard, sheet metal, etc., easily. It also allows for the rotating of material from the near vertical to the flat position and vice versa. The cart allows, for example, an individual to manipulate a sheet of plywood that is stored vertically on end in a rack, to the flat position. With the table in the upright position the material is slid out of the rack and loaded on the cart by rotating the sheet while in the vertical position to its side, placing the center of the side into the center of the material support channel. The sheet is still vertical but now on its side. It is then leaned against the table and if desired the material can be clamped in place using the material clamp. The clamp allows the operator to easily move the cart or rotate the sheet material without fear that it will separate from the cart. Once in the cart the sheet material can be transported wherever desired. It can also be rotated flat by actuating the tilt control handle. This allows the sheet to be fed off the cart and into a machine, e.g.: table saw, shaper, sander, etc., or onto a table that requires the material in that position. The cart is height adjustable for matching machinery height or workbench or table height. The cart will also allow, for example, an individual to unload plywood from the back of a pickup truck or off of a table, and transport it to a machine or storage rack. With the cart placed at the back of a pickup truck and the table in the flat position, plywood can slid out of the truck and onto the cart. If desired, the material can be clamped to the cart using the material clamp. It can then be rotated from flat to near vertical. In this position it will easily roll through a walkthrough door, 32 inches wide or wider and transported to storage or to a machine for processing.

What is claimed is:

1. A mobile sheet material handling cart comprising a lower frame and an upper frame with a height adjustment mechanism between the lower and upper frames;

wherein said lower frame is comprised of a X shaped frame having four metal legs forming said X shape, further having caster wheels located at the outer ends of each of the four legs; a baseplate attached at the center of the lower frame, said baseplate has a post welded thereto and said post projects in a direction opposite the caster wheels; said post forms a first part of the height adjustment mechanism; and the lower frame has two table stops attached to two of the four metal legs;

wherein said upper frame is comprised of a rectangular table frame having four sides, a top side, and a bottom side; a first side of the four sides having a material support channel attached along its entire length and projecting perpendicularly from the top side of the table frame, second and third sides of the four sides are perpendicular to the first side, and each of the second and third sides having one of two pivot collars attached thereto;

wherein a T-post assembly is rotatably held inside said two pivot collars at its two outermost ends, so as to allow the table frame to rotate relative to the lower frame from a horizontal position to a near vertical position; the T-post forms a second part of the height adjustment mechanism; the vertical portion of the T-post slides over the post that is attached to the lower frame, and adjustment of the height is controlled by tightening and loosening a knob and bolt assembly that clamps the T-post and the post together;

wherein the two table stops keep the table frame from rotating too far when moving the table frame from the horizontal position to the near vertical position;

wherein the cart has a tilt control assembly that is comprised of two latches and a support bar that locks the table frame in either of the horizontal or vertical positions; and wherein the cart has a material clamp; said material clamp comprising a rod, a jaw, and a tightening knob that allows the material clamp to rotate and slide over the material, said knob is tightened and the material is securely clamped between the clamp jaw and the material channel.

* * * * *